United States Patent Office 2,774,650
Patented Dec. 18, 1956

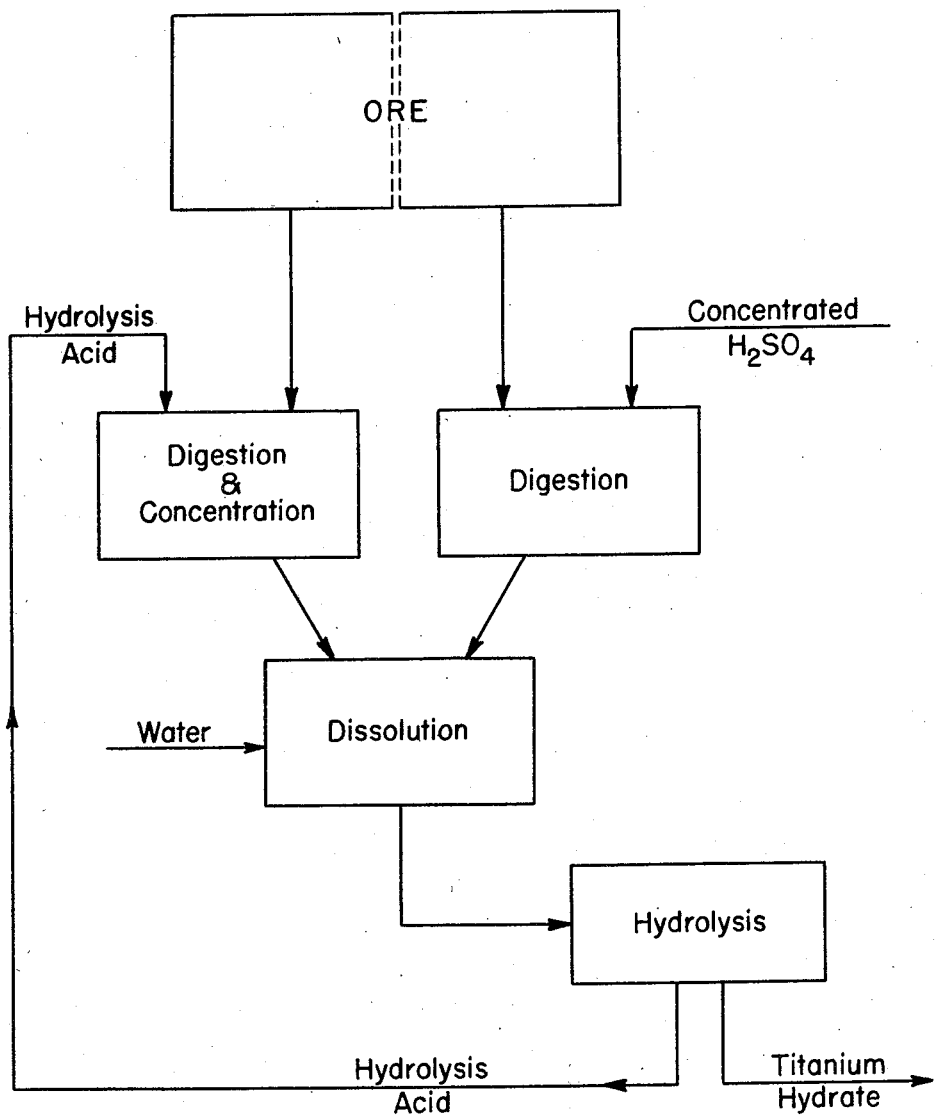

2,774,650

METHOD FOR DECOMPOSITION OF TITANIFEROUS ORES

Assur G. Oppegaard, Fredrikstad, Norway, assignor to National Lead Company, New York, N. Y., a corporation of New Jersey Application May 1, 1953, Serial No. 352,547

1 Claim. (Cl. 23—117)

It is known that in digestion of titaniferous ore, for instance, ilmenite (iron-titanium ore) with sulphuric acid, considerably less sulphuric acid may be employed in the reaction (which in general is effected with concentrated sulphuric acid) than the quantities corresponding to a complete binding of the titanium in the form of normal sulphate. It has for instance been found that a very good decomposition is obtained by using such a small quantity of acid that titanyl sulphate $TiOSO_4$ is formed. If such reaction mass, which usually is completely dry after the reaction, is dissolved in water, a precipitation of titanium hydrate respectively basic titanium sulphates or titanyl sulphate generally takes place. It has therefore been necessary to add more sulphuric acid during the dissolving in order to keep the titanium dissolved, and this sulphuric acid, which may be weak sulphuric acid, has often been added in the form of hydrolysis acid, i. e. mother liquor from the subsequent precipitation of titanium hydrate. This hydrolysis acid contains the major part of the sulphuric acid which was combined to the titanium hydrate and also iron sulphate.

It has been possible in this manner to recover a part of the hydrolysis acid at hand. This has been done by utilizing the hydrolysis acid in the preparation of the titanium solution.

The titanium ore, for instance ilmenite, may be dissolved not only in concentrated sulphuric acid but also in weaker sulphuric acid. The so-called chamber acid containing 67% $H_2SO_4$ or glover-acid with 78% of $H_2SO_4$ gives a good reaction with the ore and a high yield of dissolved $TiO_2$. By use of such weaker acid it is, however, not possible to obtain basic titanium compounds. Such basic compounds are only obtained by using concentrated acid, and for various reasons the solutions should be somewhat basic when starting the hydrolytic precipitation of titanium hydrate.

In the titanium industry difficulties have been met with in recovering and utilizing the hydrolysis acid, containing in general about 20 to 25% of sulphuric acid. If this hydrolysis acid is concentrated directly by evaporation iron-sulphate will separate out as monohydrate,

$FeSO_4 1H_2O$ at a concentration of about 50% sulphuric acid and this precipitation will complicate the operation of concentration in ordinary evaporation apparatus. The precipitated monohydrate must be removed before further evaporation can take place, and as for satisfactory decomposition a concentration to usual concentrated sulphuric acid (with $H_2SO_4$-content of for instance 96%) is aimed at, the remaining iron sulphate, which is not precipitated as monohydrate, and also other sulphates as magnesium and aluminum sulphate, will cause increasing difficulties during the operation.

These difficulties are eliminated according to this invention which broadly contemplates a process for decomposition of a titaniferous material, such as ore, slags and concentrates, with sulphuric acid which comprises separating said material into two portions, reacting one of said portions with concentrated sulphuric acid to form a basic product, reacting the other of said portions with hydrolysis acid and simultaneously concentrating by evaporation to form a non-basic product and subsequently dissolving and combining the so-formed products in a solvent selected from the group consisting of water and dilute sulfuric acid to form a basic solution.

The amount of concentrated sulfuric acid used to react with a portion of the ore should be sufficient to form a basic reaction product from 25% to 50% basicity. The preferred range should lie between about 35% and 40% basicity. The amount of hydrolysis acid which is used to react with the other portion of the ore should be sufficient to form a product which is either neutral (0% basicity) or acid up to 40% acidity. The preferred range should lie between neutral (0% basicity) and 10% acidity. The two products are then mixed in such proportions to form a solution having a final bisicity of from about 15% to about 25%. The amount of each reaction product used in the mixture is of course dependent upon the respective amounts of acid used in forming each of the two reaction products. The amounts of reaction products which are admixed therefore are adjusted in order to obtain the necessary basicity in the final solution which is from about 15% to about 25% basicity.

The terms "basicity and acidity" of titanium solutions are well known in the art. By "basic titanium solutions" are meant titanium solutions containing less acid, calculated as free and combined with the titanium values, than would be required theoretically to form the normal titanium sulfate $Ti(SO_4)_2$. The amount of acid required to form $TiOSO_4$ is considered to have a 50% basicity. The amount of acid which is equivalent to form the normal sulfate $Ti(SO_4)_2$ is expressed as being neutral or 0% basicity or 0% acidity. Sulfuric acid in excess of that to form $Ti(SO_4)_2$ is referred to as acidic.

In order to more fully describe the process of the instant invention a flowsheet of the process is presented in the accompanying drawing.

The ore is shown as being divided into two portions. One portion is admixed with hydrolysis acid and is digested and concentrated to form one of the reaction products. As previously stated, the amount of hydrolysis acid employed should be sufficient to form either a neutral solution or an acid solution up to 40% acidity, preferably neutral to 10% acidity. The other portion of ore is admixed with concentrated sulfuric acid and is digested to form the other reaction product. The amount of concentrated sulfuric acid employed should be sufficient to form a basic solution ranging from 25% to 50% basicity, preferably from about 35% to 40% basicity. The two reaction products are then mixed in such proportions to form a final solution which has a basicity which lies between about 15% to 25%. Such a final solution may be satisfactorily used for pigment production by hydrolyzing and calcining the hydrolysate. The hydrolysis acid formed by the hydrolysis step is then available for reaction with another portion of ore when required.

The portion of ore which is reacted with the concentrated sulfuric acid is carried out by the regular digestion process which includes admixing the concentrated sulfuric acid and ore and setting off the reaction by adding water or weak acid to the mixture. The reaction is violent and as the reaction is completed the entire mass becomes substantially dry and such a mass is referred to in the art as a "digestion cake."

In order to react the other portion of the ore with weak acid, the process may in practice be carried out by mixing fresh ore with hydrolysis acid and evaporating the mixture, for instance in a rotary drum to a concentration of between 65 and 80% $H_2SO_4$ in the liquid phase, and at this concentration the sulphuric acid reacts with the ore, as stated. At the same time the sulphates in the original hydrolysis acid separate out as $FeSO_4.1H_2O$ etc. The reaction mass is, however, still in a fluid state and flows from the reaction drum as a thick flowing mass. This mass may be dissolved in water and it is found that the ore has been converted to titanium and iron sulphates with a yield of about 90%. The sulphates originating from the hydrolysis acid redissolve, and the solution contains an excess of sulphuric acid or is near to its neutrality point (not basic).

When the thick flowing mass or the production solution in water is added to a digestion cake of titanium ore with concentrated sulphuric acid the reaction mass of which contains basic titanium sulphates, as titanylsulphate, the mixture after dissolving in water will have the right optimum basicity. Precipitation of basic titanium sulphates during dissolving is thereby prevented.

According to the process indicated above, it is possible to recover a great part of the hydrolysis acid at hand without the disadvantages usually connected with the concentration of hydrolysis acid.

It is, of course, possible to evaporate the hydrolysis acid separately in a drum, and not in contact with the ore to be decomposed. However, the reaction between the titanium ore and the sulphuric acid is strongly exothermic and by allowing the evaporation and the decomposition reaction to take place at the same time this exothermic reaction is utilized to the benefit of the evaporation, i. e. the reaction heat is not lost. Therefore, the described process is favorable from the point of view of heat economy besides the other practical advantages which it presents.

When the titanium ore is dissolved by weak sulphuric acid, the recovery of dissolved ore may be somewhat lower than by digestion of the ore with concentrated sulphuric acid. It may therefore be expedient to take the part of the ore, which is not dissolved during the first reaction with the weaker acid back to renewed reaction. This is best done by submitting the mud (sludge) which is obtained by the clarification of the solution, to a washing or elutriation step, whereby the coarser particles of undissolved ore are separated from the gangue etc., which follows the ore and which is not decomposed at all. The undecomposed ore separated in this manner may go to renewed reaction either with the weaker sulphuric acid or with concentrated acid. It may also occur that the reaction with concentrated sulphuric acid is not entirely complete and in such a case a similar treatment may take place with the undecomposed part of the ore from this reaction.

In order to illustrate the process of this invention, the following examples are shown:

*Example 1*

20 tons of ground ilmenite, containing about 45% $TiO_2$ and 35% Fe is digested with 27 tons of $H_2SO_4$ in concentrated sulphuric acid of 85% $H_2SO_4$ strength. The digestion cake is a porous, dry mass (mass 1) in which 95% of $TiO_2$ is converted into soluble sulphates, and which, if dissolved in water, would give a solution of about 40% basicity ($H_2SO_4/TiO_2$ ratio about 1.5).

10 tons of the same ilmenite is mixed with 20 tons of $H_2SO_4$ in hydrolysis acid of 25% $H_2SO_4$ strength (from previous precipitation of titanium hydrate), and taken through an acid-proof brick lined rotary, horizontal drum which is heated by an oil-flame at the exit end. The acid is thereby concentrated and reacts with the ore when the acid concentration has reached about 60–70% $H_2SO_4$. A pasty mass is finally obtained, containing about 90% of the $TiO_2$ as soluble sulphates. This pasty mass is mixed with water and stirred whereby the soluble titanium and iron sulphates are dissolved. The solution obtained contains about 100 g. p. l. $TiO_2$ and is acidic in nature, having a $H_2SO_4/TiO_2$ ratio of about 3.0.

This solution is transferred to the tank in which the reaction mass 1 was formed. Mass 1 is dissolved in the solution and additional water, to give a final solution of about 120 g. p. l. $TiO_2$ and about 20% basicity ($H_2SO_4/TiO_2$ ratio about 2.0), the right composition for further processing in the manufacture of titanium pigments.

It will be seen that for a total of 30 tons ilmenite about 27 tons of fresh $H_2SO_4$ is used according to the example. This gives an $H_2SO_4$/ore ratio of 0.9. When no recovery of hydrolysis acid takes place, the $H_2SO_4$/ore ratio is 1.6. It will thus be seen that a saving of about 0.7 ton of $H_2SO_4$ per ton of ore is obtained. If the hydrolysis acid had not been used for digestion of ore, but only for adjustment of the basicity of mass 1 (from 40 to 20% basicity) only 0.2 ton of $H_2SO_4$ in hydrolysis acid per ton of ore would have been saved (versus 0.7 ton above).

The total amount of free $H_2SO_4$ which is present in the hydrolysis acid and which may be recovered from above digestion (and hydrolysis) of a total of 30 tons of ilmenite is about 23 tons. Of these 23 tons approximately 20 tons are recovered according to this example, whereas 3 tons go with the titanium hydrate precipitate—giving a ratio of unrecovered to recovered acid of about 15%.

As most of the iron sulphate and some of the magnesium and manganese sulphate which are present in solution are removed by crystallization before the hydrolysis step, these impurities will not accumulate by the recovery process to any undue extent.

*Example 2*

The digestion of ilmenite is carried out as in Example 1, 20 tons by fresh concentrated acid, and 10 tons by hydrolysis acid under evaporation. The residue of the final solution (of 20% basicity) is washed by hydroseparation to remove gangue. The recovered ore is taken back to the digestion drum, using hydrolysis acid under evaporation and 60% of the $TiO_2$ of the recovered ore is converted into soluble sulphates. Thereby the average $TiO_2$ digestion recovery is increased from about 93% to about 97%.

*Example 3*

The digestion of ilmenite is carried out as in Example 1, 20 tons by concentrated fresh acid, and 10 tons by hydrolysis acid under evaporation. The latter is, however, not carried out as a continuous operation, but as a batch operation, the pasty cake obtained in the rotary drum (by digestion of ilmenite by hydrolysis acid under evaporation) being dissolved in the same drum by water. After dissolving the solution is taken to the mass 1 tank (as in Examples 1 and 2).

*Example 4*

20 tons of ground titanium oxide slag, containing about 65% $TiO_2$ and 5% Fe is digested with 28 tons of $H_2SO_4$ in concentrated sulphuric acid of 90% $H_2SO_4$ strength. The digestion cake is a porous, dry mass (mass 1) in which 95% of $TiO_2$ is converted into soluble sulphates, and which, if dissolved in water, would give a solution of about 40% basicity ($H_2SO_4/TiO_2$ ratio about 1.5).

20 tons of the same slag is mixed with 38 tons of $H_2SO_4$ in hydrolysis acid of 25% $H_2SO_4$ strength (from previous precipitation of titanium hydrate), and taken through an acid-proof brick lined rotary, horizontal drum which is heated by an oil-flame at the exit end. The acid is thereby concentrated and reacts with the slag when the acid concentration has reached 60–70% $H_2SO_4$. A pasty mass is finally obtained, containing about 90% of the $TiO_2$ as soluble sulphates. This pasty mass is mixed with water and stirred whereby the soluble titanium and iron sulphates are dissolved. The solution obtained contains about 130 g. p. l. TiO₂ and is "neutral" in nature, having a H₂SO₄/TiO₂ ratio of about 2.45.

This solution is transferred to the tank in which the reaction mass 1 was formed. Mass 1 is dissolved in the solution and additional water, to give a final solution of about 150 g. p. l. TiO₂ and about 20% basicity (H₂SO₄/TiO₂ ratio of about 2.0), the right composition for further processing in the manufacture of titanium pigments.

It will be seen that for a total of 40 tons of slag approximately 28 tons of fresh H₂SO₄ is used according to the example. This gives an H₂SO₄/slag ratio of 0.7. When no recovery of hydrolysis acid takes place the H₂SO₄/slag ratio would be 1.6. It will thus be seen that a saving of 0.9 ton of H₂SO₄ per ton of slag is obtained. If the hydrolysis acid had not been used for digestion of slag, but only for adjustment of the basicity of mass 1 (from 40 to 20% basicity) only 0.3 ton of H₂SO₄ in hydrolysis acid per ton of slag would have been saved (versus 0.9 ton above).

The total amount of free H₂SO₄ which is present in the hydrolysis acid and which may be recovered from above digestion (and hydrolysis) of a total of 40 tons of slag is about 44 tons. Of these 44 tons approximately 38 tons are recovered according to this example, whereas approximately 6 tons go with the titanium hydrate precipitate giving a bleeding ratio of unrecovered to recovered acid of 15%.

*Example 5*

The digestion of slag is carried out as in Example 1, 20 tons by fresh concentrated acid, and 20 tons by hydrolysis acid under evaporation. The residue of the final solution (of 20% basicity) is washed to remove calcium sulphate formed in the digestion. The recovered slag is taken back to the digestion drum, using hydrolysis acid under evaporation, and 70% of the TiO₂ of the recovered slag is converted into soluble sulphates. Thereby the average TiO₂ digestion recovery is increased from about 93% to about 97%.

It may be understood that the undecomposed part of the ore, which is recovered in the described manner, may be present in aqueous suspension and it will therefore usually be natural to allow the aqueous suspension to go to reaction with the hydrolysis acid under evaporation.

The process described is equally applicable to the digestion of titanium oxide slag, obtained in smelting of titanium ore. Such slag will contain small amounts of iron and a crystallization step for removal of ferrous sulphate before hydrolysis, may therefore not be required.

While this invention has been described and illustrated by the examples shown, it is not intended to be strictly limited thereto and other modifications and variations may be employed within the scope of the following claim.

I claim:

Process for decomposition of titaniferous material with sulfuric acid which comprises the following steps: (1) separating said material into two portions; (2) reacting one of said portions with concentrated sulfuric acid, the amount of concentrated sulfuric acid used being sufficient to form a product from 35% to 40% basic; (3) reacting the other portion of said material with hydrolysis acid and simultaneously concentrating to form a product, the amount of hydrolysis acid used being sufficient to form a product which is neutral to 10% acidic; and (4) subsequently dissolving and combining the so-formed products in an aqueous media to form a solution which has a basicity from 15% to 25%.

References Cited in the file of this patent

UNITED STATES PATENTS

| | | |
|---|---|---|
| 2,098,025 | Booge et al. | Nov. 2, 1937 |
| 2,278,709 | Moran | Apr. 7, 1942 |
| 2,327,166 | Bousquet et al. | Aug. 17, 1943 |